United States Patent
Kogiso

(10) Patent No.: US 9,193,380 B2
(45) Date of Patent: Nov. 24, 2015

(54) STEERING-SHAFT-ROTATION-ANGLE DETECTION DEVICE

(75) Inventor: Yoshinori Kogiso, Mizunami (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 32 days.

(21) Appl. No.: 14/009,082

(22) PCT Filed: Mar. 1, 2012

(86) PCT No.: PCT/JP2012/055212
§ 371 (c)(1),
(2), (4) Date: Sep. 30, 2013

(87) PCT Pub. No.: WO2012/132751
PCT Pub. Date: Oct. 4, 2012

(65) Prior Publication Data
US 2014/0019009 A1    Jan. 16, 2014

(30) Foreign Application Priority Data
Mar. 31, 2011   (JP) .................................. 2011-078166

(51) Int. Cl.
*B62D 15/00*    (2006.01)
*B62D 5/04*     (2006.01)
*B62D 15/02*    (2006.01)
*G01D 5/244*    (2006.01)

(52) U.S. Cl.
CPC .......... *B62D 5/0481* (2013.01); *B62D 15/0235* (2013.01); *G01D 5/244* (2013.01)

(58) Field of Classification Search
None
See application file for complete search history.

(56) References Cited

U.S. PATENT DOCUMENTS

| 6,354,396 | B1 | 3/2002 | Horton et al. |
| 6,364,050 | B1 | 4/2002 | Horton |
| 2006/0090952 | A1 | 5/2006 | Ito |
| 2006/0293818 | A1 | 12/2006 | Lu et al. |
| 2007/0216403 | A1 | 9/2007 | Asano |
| 2011/0106382 | A1 | 5/2011 | Kageyama |

FOREIGN PATENT DOCUMENTS

| EP | 1923299 A1 | 5/2008 |
| JP | 62291516 A | 12/1987 |

(Continued)

OTHER PUBLICATIONS

JPO Machine Translation of JP 2007-302042.*

(Continued)

*Primary Examiner* — John R Olszewski
*Assistant Examiner* — James M McPherson
(74) *Attorney, Agent, or Firm* — Hauptman Ham, LLP

(57) ABSTRACT

A steering-shaft-rotation-angle detection device that detects a rotation angle of a steering shaft that is rotated by operation of a steering wheel, includes an electric motor that assists steering of the steering wheel by a driver, a speed reduction mechanism that reduces speed of rotation of the electric motor and transmits the rotation to the steering shaft, a rotating body that is attached to a rotation shaft of the electric motor, a signal output unit that outputs a signal in accordance with rotation of the rotating body, and a controller that calculates a rotation angle of the rotating body on the basis of the output signal from the signal output unit and calculates, on the basis of this rotation angle and a speed reduction ratio of the speed reduction mechanism, a rotation angle of the steering shaft.

11 Claims, 5 Drawing Sheets

(56) References Cited

FOREIGN PATENT DOCUMENTS

| | | | |
|---|---|---|---|
| JP | 3120419 | A | 5/1991 |
| JP | 6-62305 | U | 9/1994 |
| JP | 662322 | U | 9/1994 |
| JP | 20014313 | A | 1/2001 |
| JP | 200543224 | A | 2/2005 |
| JP | 2005181094 | A | 7/2005 |
| JP | 2007248172 | A | 9/2007 |
| JP | 2007302042 | A | 11/2007 |
| JP | 2008151762 | A | 7/2008 |
| JP | 2008-213743 | A | 9/2008 |
| JP | 2008215998 | A | 9/2008 |
| JP | 2008224283 | A | 9/2008 |
| JP | 201023697 | A | 2/2010 |
| JP | 2010162954 | A | 7/2010 |
| JP | 2010-237082 | A | 10/2010 |

OTHER PUBLICATIONS

JPO Machine Translation of JP 2008-151762.*
JPO Machine Translation of JP 662322.*
Office Action mailed Sep. 9, 2014, corresponding to Japanese patent application No. 2011-078166.
Corresponding International Application No. PCT/JP2012/055212 Search Report dated May 1, 2012.
Office Action mailed Jan. 20, 2015, corresponding to Japanese patent application No. 2011-078166.
Extended European Search Report issued Jun. 10, 2015, corresponding to European patent application No. 12763537.3.

* cited by examiner

STEERING-SHAFT-ROTATION-ANGLE DETECTION DEVICE

RELATED APPLICATIONS

The present application is based on and claims priority to International Application Number PCT/JP2012/055212, filed Mar. 1, 2012, and Japanese Application Number 2011-078166, filed Mar. 31, 2011, the disclosure of which is hereby incorporated by reference herein in its entirety.

TECHNICAL FIELD

The present invention relates to a device that detects a rotation angle of a steering shaft of a vehicle etc.

BACKGROUND ART

In the related art, a device that detects a steering angle is mounted on vehicles in which various controls are performed on the basis of a steering angle (see JPH03-120419A).

Devices in which an optical rotary encoder or a magnetic rotary encoder is provided on a steering shaft are known as those tor detecting the steering angle.

SUMMARY OF INVENTION

The resolution of the conventional rotary encoders depend on the number of slits formed on a rotation disc in the case of the optical rotary encoders and on the number of north poles and south poles in the case of the magnetic rotary encoders. Therefore, in order to improve the resolution, the rotary encoder needs to be larger in size, and in such a case, there is a problem in that a sufficient space for installing the rotary encoder cannot be ensured in vehicles.

The present invention has been designed in consideration of this problem, and an object thereof is to provide a steering-shaft-rotation-angle detection device that has a simple configuration and that is capable of detecting a rotation angle of a steering shaft at a high resolution.

According to one aspect of the present invention, a steering-shaft-rotation-angle detection device that detects a rotation angle of a steering shaft that is rotated by operation of a steering wheel is provided. The steering-shaft-rotation-angle detection device comprises an electric motor that assists steering of the steering wheel by a driver; a speed reduction mechanism that reduces speed of rotation of the electric motor and transmits the rotation to the steering shaft; a rotating body that is attached to a rotation shaft of the electric motor; a signal output unit that outputs a signal in accordance with rotation of the rotating body; and a controller that calculates a rotation angle of the rotating body on the basis of the output signal from the signal output unit and calculates, on the basis of this rotation angle and a speed reduction ratio of the speed reduction mechanism, a rotation angle of the steering shaft.

Embodiments of the present invention and advantages thereof are described in detail below with reference to the accompanying drawings.

DESCRIPTION OF EMBODIMENTS

Embodiments according to the present invention will be described below with reference to the drawings.

(First Embodiment)

A steering-shaft-rotation-angle detection device 100 according to the first embodiment of the present invention will be described.

The steering-shaft-rotation-angle detection device 100 is a device that detects the absolute rotation angle (hereinafter referred to simply as "rotation angle") of a steering shaft 2 that is rotated by operation of a steering wheel 1 of a vehicle and utilises a system of a power steering device 101 that assists steering force applied to the steering wheel 1 by a driver.

Because the absolute rotation angle of the steering shaft 2 and the steering angle, that is, the steering absolute angle of the steering wheel 1 are the same, the steering angle of the steering wheel 1 can be obtained by detecting the rotation angle of the steering shaft 2 by the steering-shaft-rotation-angle detection device 100.

Figure 1:
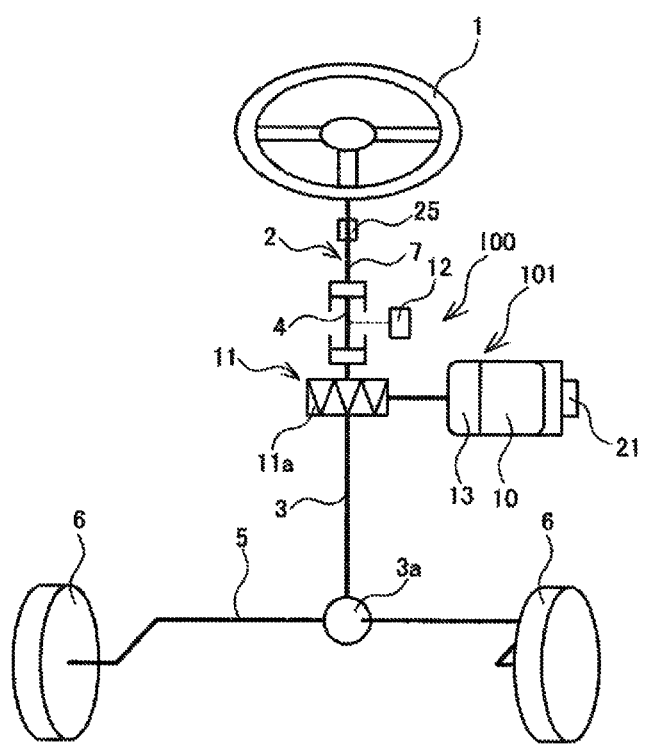
FIG. 1 is a configuration diagram of a steering-shaft-rotation-angle detection device according to a first embodiment of the present invention.

As shown in FIG. 1, the power steering device 101 includes an input shaft 7 that is rotated as the steering wheel 1 is operated by a driver and an output shaft 3 that is connected to the input shaft 7 through a torsion bar 4 and linked to a rack shaft 5. The power steering-device 101 steers wheels 6 by moving, in the axial direction, the rack shaft 5 that is engaged with a pinion 3a provided at the lower end of the output shaft 3. The steering shaft 2 is configured with the input shaft 7 and the output shaft 3.

The power steering device 101 includes an electric motor 10 that assists steering of the steering wheel 1 by a driver, a speed reducer 11 that reduces the speed of the rotation of the electric motor 10 and transmits it to the steering shaft 2, a torque sensor 12 that detects the steering torque applied to the torsion bar 4 by the relative rotation between the input shaft 7 and the output shaft 3, and a controller 13 that controls driving of the electric motor 10 on the basis of the detection result by the torque sensor 12.

The speed reducer 11 consists of a worm shaft that is connected to an output shaft of the electric motor 10 and a worm wheel 11a that is connected to the output shaft 3 and is engaged with the worm shaft. The speed reduction ratio of the speed reducer 11 is 1:15. In other words, for every rotation of the steering shaft 2, the electric motor 10 rotates 15 times.

The torque output from the electric motor 10 is transmitted to the worm wheel 11a from the worm shaft and applied to the output shaft 3 as the assist torque. The torque output from the electric motor 10 is calculated on the basis of the steering torque detected by the torque sensor 12.

Figure 2:
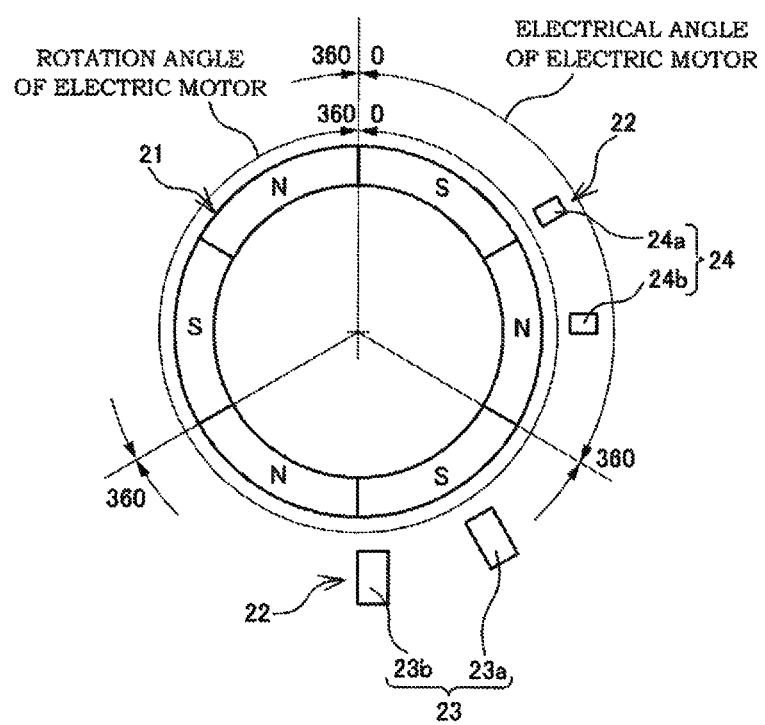
FIG. 2 is a plan view of a ring magnet.

The steering-shaft-rotation-angle detection device 100 includes the electric motor 10, the speed reducer 11, a ring magnet 21 serving as a rotating body that is attached to a rotation shaft of the electric motor 10 (see FIG. 2), and angle sensors 22 serving as signal output units that output signals in accordance with the rotation of the ring magnet 21 (see FIG. 2). A controller 13 calculates the rotation angle of the ring magnet 21, i.e. the rotation angle of the electric motor 10, on the basis of the output signals from the angle sensors 22, and on the basis of this rotation angle and the speed reduction ratio of the speed reducer 11, calculates the rotation angle of the steering shaft 2. The speed reducer 11 corresponds to the speed reduction mechanism in the present invention.

The steering-shaft-rotation-angle detection device 100 also includes an index sensor 25 serving as a reference-rotational-position detector that detects a reference rotational position of the steering shaft 2.

The controller 13 includes a CPU that controls operation of the steering-shaft-rotation-angle detection device 100 and the power steering device 101, a ROM that stores a control program, setting values, and so forth required for processing and operation of the CPU, and a RAM that temporarily stores information detected by various sensors, such as the torque sensor 12, the angle sensors 22, the index sensor 25, and so forth. The ROM is a nonvolatile memory (nonvolatile storage unit) that keeps the stored information even when power supply to the controller 13 is disconnected, and the RAM is a volatile memory (volatile storage unit) that loses the stored information when power supply to the controller 13 is disconnected.

Figure 4:
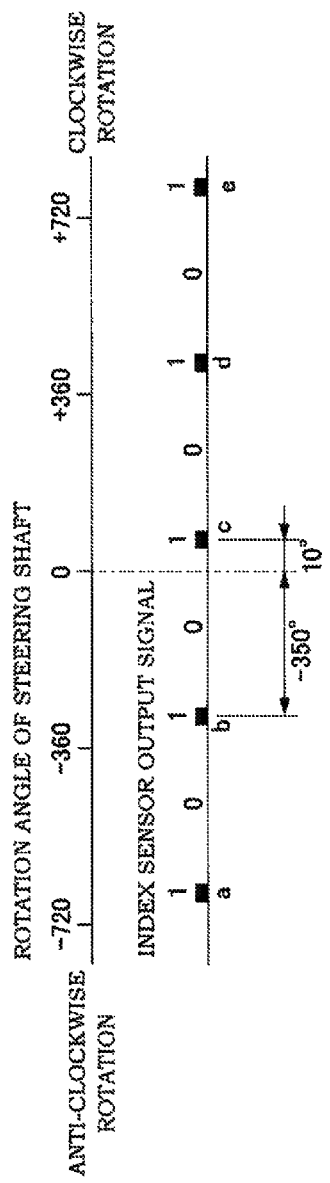
FIG. 4 is a diagram showing the output signals from an index sensor in relation to the rotation angle of a steering shaft.
Figure 5:
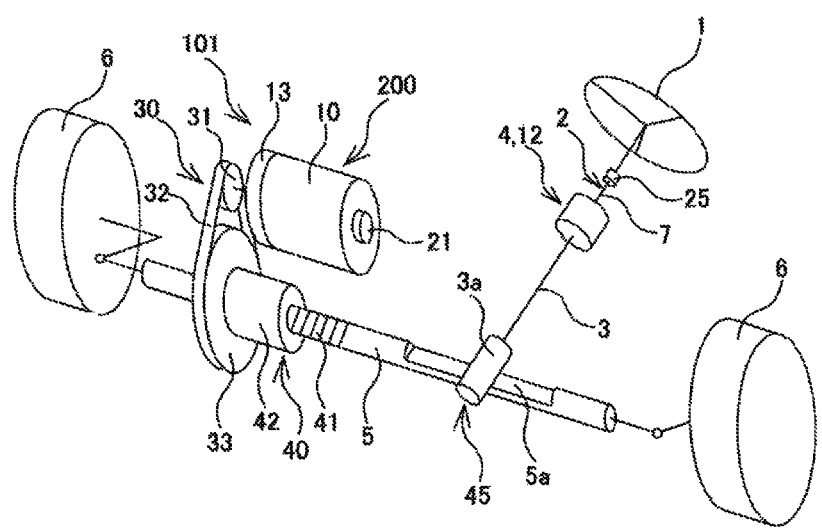
FIG. 5 is a configuration diagram of a steering-shaft-rotation-angle detection, device according to a second embodiment of the present invention.

Explanation of the index sensor 25 will be provided in detail with reference to FIGS. 1 and 4. The index sensor 25 is a magnetic sensor includes a magnetism generator that is fixed to the input shaft 7 and generates magnetism and a detecting unit that is fixed to a non-rotating portion, such as a steering column etc., and detects the magnetism generated by the magnetism generator. The index sensor 25 outputs a pulse of signal for every rotation of the steering shah 2, and the output signal is input to the controller 13.

In general, the steering shaft 2 is configured so as to rotate approximately twice in both anti-clockwise and clockwise directions from the reference neutral state at which the wheels 6 are directed in the straight direction. Therefore, as shown in FIG. 4, the index sensor 25 outputs five pulse signals (pulses a to e) along the rotation of the steering shaft 2. When a vehicle is assembled or when the power steering device 101 is assembled, a measurement is performed on the anti-clockwise and clockwise rotation angles at which the index sensor 25 outputs the first pulse signal by rotating the steering shaft 2 anti-clockwise and clockwise from the neutral position of the steering shaft 2 at which the wheels 6 are directed in the straight direction (the position with 0° steering angle). In this description, the measured value of the rotation angle at which the index sensor 25 outputs the first pulse signal when the steering shaft 2 is rotated clockwise from the neutral position (the pulse c) is assumed to be 10°, and the measured value of the rotation angle at which the index sensor 25 outputs the first pulse signal when the steering shaft 2 is rotated anti-clockwise from the neutral position (the pulse b) is assumed to be −350°. The determined values in the anti-clockwise and clockwise directions (10° and −350°) are stored in the ROM of the controller 13 as the reference rotation angles of the steering shaft 2 corresponding to the first pulse signals (the pulses c and b) from the index sensor 25. As described above, the reference rotation angles of the steering shaft 2 are set in advance at the time a vehicle is assembled or the power steering device 101 is assembled. The rotation angles of the steering shaft 2 are shown with + sign for the clockwise rotation and − sign for the anti-clockwise rotation by taking the neutral position as the reference.

The above-described embodiment has been described in terms of a case where the index sensor 25 is a magnetic sensor; however, the index sensor 25 may be configured as an optical sensor formed of a light emitting unit and a light receiving unit.

Figure 3:
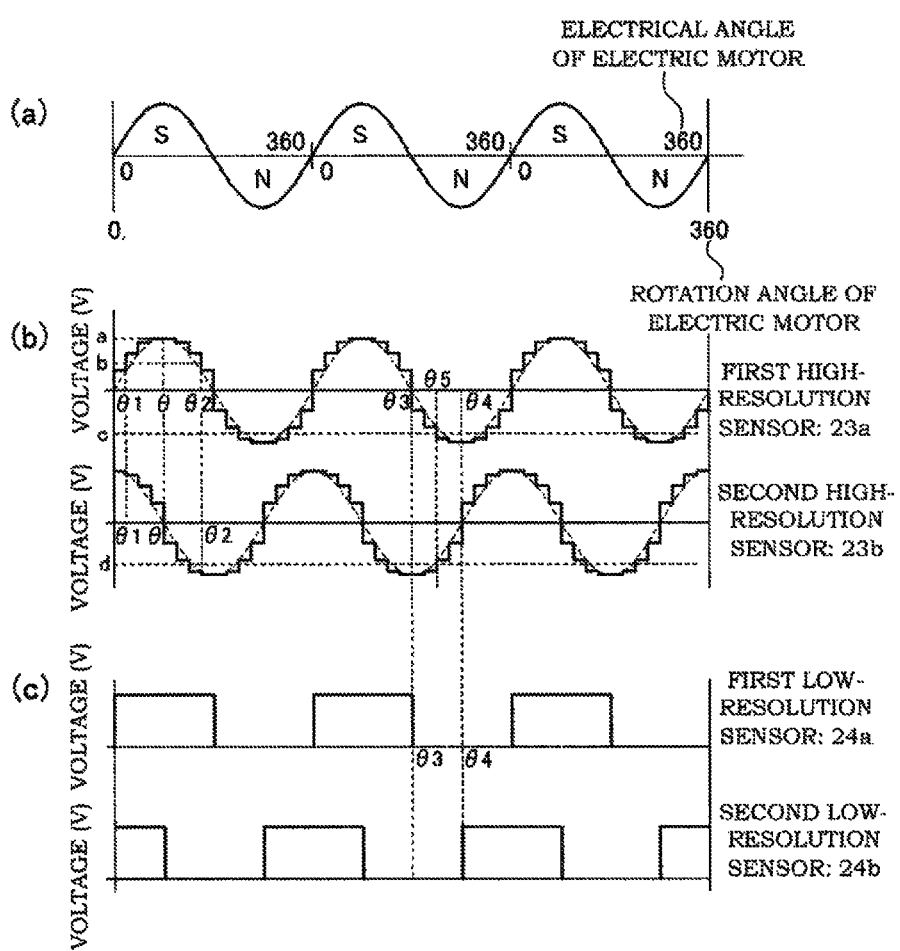
FIG. 3(a) is a diagram, showing change in magnetic force generated by the ring magnet, (b) is a diagram showing output, signals from a first high-resolution sensor (shown above) and a second high-resolution sensor (shown below). (c) is a diagram showing output signals from a first low-resolution sensor (shown above) and a second low-resolution sensor (shown below).

Next, the ring magnet 21 that is attached to the rotation shaft of the electric motor 10 and the angle sensors 22 that output signals in accordance with the rotation of the ring magnet 21 will foe described in detail with reference to FIGS. 1 to 3.

The ring magnet 21 is a ring shaped permanent magnet that is magnetized in the rotation direction, is attached to the rotation shaft of the electric motor 10 by fitting its inner circumferential surface with the outer circumferential surface of the rotation shaft. The ring magnet 21 rotates together with the rotation shaft of the electric motor 10.

As shown in FIG. 2, six magnetic poles are formed on the ring magnet 21 at equal intervals along the circumferential direction. In other words, three north poles and three south poles are alternately arranged in the circumferential direction. Therefore, as shown in FIG. 3(*a*), for every rotation of the electric motor 10, the magnetic force generated from the ring magnet 21 changes for three sinusoidal cycles.

As shown in FIG. 2, the angle sensors 22 include two types of magnetic sensors: high-resolution sensors 23 serving as high-resolution output units having a relatively high resolution and low-resolution sensors 24 serving as low-resolution output units having a relatively low resolution. Basically, the high-resolution sensors 23 are operated when an ignition switch of a vehicle is on, and the low-resolution sensors 24 are operated when the ignition switch of a vehicle is off. As described above, the high-resolution sensors 23 and the low-resolution sensors 24 are switched in accordance with the on-off state of the ignition switch of a vehicle. The high-resolution sensors 23 and the low-resolution sensors 24 are fixed to non-rotating portions and output signals in accordance with the rotation of the ring magnet 21.

The high-resolution sensors 23 consist of a first high-resolution sensor 23*a* and a second high-resolution sensor 23*b* that are arranged so as to face against the outer circumference of the ring magnet 21 and so as to be separated from each-other at a predetermined angle. The first high-resolution sensor 23*a* and the second high-resolution sensor 23*b* are the same sensors, and as shown in FIG. 3(*b*), they output sinusoidal signals (voltages) in accordance with the rotation of the ring magnet 21. The first high-resolution sensor 23*a* and the second high-resolution sensor 23*b* are arranged such that the phases of the respective sinusoidal signals are shifted by 90°. Because the ring magnet 21 has six magnetic poles, for every rotation of the electric motor 10, the first high-resolution sensor 23*a* and the second high-resolution sensor 23*b* output the signals for three sinusoidal cycles. In other words, the electrical angle periodicity of the electric motor 10 is three.

The resolution of the high-resolution sensors 23 will be described. The high-resolution sensors 23 have three hundred and sixty resolution per electrical angle of 360° (1° resolution). In addition, the electrical angle periodicity per rotation of the electric motor 10 is three. Furthermore, the speed reduction ratio of the steering shaft 2 to the electric motor 10 is 1:15. Therefore, the resolution of the high-resolution sensors 23 for the rotation angle of the steering shaft 2 is calculated to be 0.022° as in the following expression.

Resolution of high-resolution sensor for the rotation angle of the steering shaft 2=360/360/3/15=0.022°

The output signals (voltages) from the high-resolution sensors 23 are input to the controller 13, and the controller 13 calculates an amount of change in the rotation angle of the steering shaft 2 on the basis of the input signals. To give a specific explanation, a table in which relationships between the output voltages of the high-resolution sensors 23 and the corresponding electrical angles of the electric motor 10 are stated is stored in the ROM of the controller 13, and the controller 13 can calculate an amount of change in the electrical angle by referring to the table. For example, if the amount of change in the electrical angle is found to 5° by referring to the table, because the electrical angle periodicity per rotation of the electric motor 10 is three, the amount of change in the rotation angle of the electric motor 10 is calculated to be 1.67° (=5/3). Because the speed reduction ratio of the steering shaft 2 to the electric motor 10 is 1:15, the amount of change in the rotation angle of the steering shaft 2 is calculated to be 0.11° (=1.67/15). As described above, it is possible to calculate the amount of change in the rotation angle of the steering shaft 2 on the basis of the speed reduction ratio of the speed reducer 11 and the amount of change in the rotation angle of the electric motor 10 that is calculated on the basis of the output signals from the high-resolution sensors 23.

In addition, because there is 90° shift between the phases of the sinusoidal signals output by the first high-resolution sensor 23a and the second high-resolution sensor 23b, the controller 13 can identify the rotation direction of the steering shaft 2. To give a specific explanation with reference to FIG. 3(b), for example, when the electrical angle of the electric motor 10 is θ (the output voltage of the first high-resolution sensor 23a is a) and when the output voltage of the first high-resolution sensor 23a is changed from a to b, it is not possible to determine if the electrical angle of the electric motor 10 has changed from θ to θ1 or from θ to θ2 by the first high-resolution sensor 23a only. In other words, it is not possible to identify the rotation-direction of the steering shaft 2. However, because the output voltages at the electrical angles θ1 and θ2 are different at the second high-resolution sensor 23b, it is possible to determine if the electrical angle of the electric motor 10 has changed from θ to θ1 or from θ to θ2 depending on the change in the output voltage from the second high-resolution sensor 23b. In other words, it is possible to identify the rotation, direction of the steering shaft 2.

As shown in FIG. 2, the low-resolution sensors 24 consist of a first low-resolution sensor 24a and a second low-resolution sensor 24b. The first low-resolution sensor 24a and the second low-resolution sensor 24b are arranged so as to face against the outer circumference of the ring magnet 21 and so as to be separated from each other at a predetermined angle. The first low-resolution sensor 24a and the second low-resolution sensor 24b are the same sensors, and as shown in FIG. 3(c), they output pulse signals (voltages) when they are faced against the south poles along the rotation of the ring magnet 21. The first low-resolution sensor 24a and the second low-resolution sensor 24b are arranged such that there is a change in the pulse signal output for every ¼ electrical angle cycle, in other words, for every 90° electrical angle.

The resolution of the low-resolution sensors 24 will be described. Because there is a change in the pulse signal output for every ¼ electrical angle cycle as described above, the low-resolution sensors 24 have four resolution per electrical angle of 360° (90° resolution). In addition, the electrical angle periodicity per rotation of the electric motor 10 is three. Furthermore, the speed reduction ratio of the steering shaft 2 to the electric motor 10 is 1:15. Therefore, the resolution of the low-resolution sensors 24 for the rotation angle of the steering shaft 2 is calculated to be 2° as in the following expression.

Resolution of low-resolution sensor for the rotation angle of the steering shaft 2=360/4/3/15=2°

As described above, the resolution of the low-resolution sensors 24 is relatively lower than that of the high-resolution sensors 23.

The output signals (voltages) from the low-resolution sensors 24 are input to the controller 13. Because the output signals from the low-resolution sensors 24 are pulse signals, the controller 13 cannot calculate the amount of change in the rotation angle of the steering shaft 2 on the basis of the input signals. However, because the pulse signals output from the low-resolution sensors 24 change every electrical angle of 90°, the controller 13 can determine in which section among twelve sections, which, are sectioned at every 90°, the electric motor 10 is positioned at the present time on the basis of the change in the pulse signals output from the low-resolution sensors 24. In addition, the controller 13 can identify the rotation direction of the steering shaft 2 from the change in the pulse signals output from the low-resolution sensors 24.

The low-resolution sensors 24 are operated when the ignition switch is off. Because the engine of a vehicle is halted when the ignition switch is off, there is no need to precisely detect the rotation angle of the steering shaft 2. However, even when the engine of a vehicle is halted, there is still a possibility that the steering wheel 1 is steered, and therefore, the controller 13 determines in which range the electrical angle of the electric motor 10 is positioned at the present time on the basis of the detection result by the low-resolution sensors 24.

Switching between, the high-resolution sensors 23 and the low-resolution sensors 24 performed by turning the Ignition switch on/off will foe described. When the ignition switch is turned off, the rotation angle of the steering shaft 2 and the electrical angle of the electric motor 10 at that time are stored in the controller 13, and the detection by the high-resolution sensors 23 is switched to the detection by the low-resolution sensors 24. If the steering wheel 1 is steered when the ignition switch is off, the controller 13 determines in which range the electrical angle of the electric motor 10 is positioned at the present time on the basis of the change in the pulse signal output by the low-resolution sensors 24.

When the ignition switch is turned on, the detection by the low-resolution sensors 24 is switched to the detection by the high-resolution sensors 23. The controller 13 determines the electrical angle when the ignition switch is turned on on the basis of the output signals from the high-resolution sensors 23 and the electrical, angle range that has been determined on the basis of the output signals from the low-resolution sensors 24. To give a specific explanation with reference to FIG. 3(b), when the ignition switch is turned on, if the output voltage of the first high-resolution sensor 23a is c and if the output, voltage of the second high-resolution sensor 23b is d, then, there are three corresponding electrical angles. However, because the controller 13 can determine that the electrical angle of the electric motor 10 when the ignition switch is turned on is, for example, in the range between θ3 to θ4 on the basis of the change in pulse signals output from the low-resolution sensors 24 in a case where the ignition switch is off, it is possible to determine that the electrical angle when the ignition switch is on is θ5 among the three points.

Next, the controller 13 calculates the amount of change between the electrical angle when the ignition switch is on and the electrical angle when the ignition switch is off that is stored in the controller 13. As described above, the controller 13 then calculates the amount of change in the rotation angle of the steering shaft 2 from, the amount of change in the electrical angle, and by adding this amount of change in the rotation angle to the rotation angle of the steering shaft 2 when the ignition switch is off that is stored in the controller 13, calculates the rotation angle of the steering shaft 2 when the ignition switch is on. By doing so, when the ignition switch is turned on, the detection, of the rotation angle of the steering shaft 2 is restarted.

When the high-resolution, sensors 23 are operated, the controller 13 calculates the amount of change in the rotation angle of the steering shaft 2 on the basis of the output signals from the high-resolution sensors 23, and on the basis of the calculated result, calculates the rotation angle of the steering shaft 2. On the other hand, when the low-resolution sensors 24 are operated, the controller 13 only determines in which range the electrical angle of the electric motor 10 is positioned. Therefore, the power consumption by the controller 13 when the high-resolution sensors 23 are operated is higher compared with the power consumption by the controller 13 when the low-resolution sensors 24 are operated. Thus, if the high-resolution sensors 23 are operated even when the ignition switch is off, there is a risk of the battery being run out, and therefore, when the ignition switch is off, the high-resolution sensors 23 are switched to the low-resolution sensors 24 that consume less power.

In order to reduce the power consumption during the low-resolution sensors 24 are operated, it is preferred to stop the process of determining in which range the electrical angle of the electric motor 10 is positioned by the controller 13 when the ignition switch is off and to set the controller 13 to a standby state. In the standby state, the controller 13 only counts the number of changes in the pulse signals output from the low-resolution sensors 24 and stores it in the RAM. When the ignition switch is turned on, the controller 13 then determines in which range the electrical angle of the electric motor 10 is positioned at the present time on the basis of the number of changes in the pulse signals stored in the RAM. Therefore, when the ignition switch is off, the power supply to the controller 13 may only need to be done to the RAM at least.

In addition, in order to further reduce the power consumption, when the ignition switch is off, only the detection by the low-resolution sensors 24 may be performed, and the controller 13 may be in a halted state. In this case, the controller 13 is changed horn the halted state to the above-mentioned standby state when the rotation of the electric motor 10 is detected by the low-resolution sensors 24, in other words, when the pulse signals are output from the low-resolution sensors 24. Thereafter, as described above, the controller 13 only counts the number of changes in the pulse signals output from the low-resolution sensors 24 and stores it in the RAM. In addition, as an alternative way, the detection, by the high-resolution sensors 23 may be switched to the detection by the low-resolution sensors 24 when the rotation of the electric motor 10 is detected by the low-resolution sensors 24. In other words, even when the ignition switch is off, the controller 13 may calculates the rotation angle of the steering shaft 2 when the rotation of the electric motor 10 is detected by the low-resolution sensors 24. In this case, in consideration of the time required to start up the high-resolution sensors 23, switching to the detection by the high-resolution sensors 23 is preferably performed after a prescribed period of time has elapsed since the rotation of the electric motor 10 has detected by the tow-resolution sensors 24. In other words, it is preferable that switching from the low-resolution sensors 24 to the high-resolution sensors 23 is performed after the high-resolution sensors 23 have been started up and the detection thereby is stabilised.

Next, detection operation of the rotation angle of the steering shaft 2 by the steering-shaft-rotation-angle detection device 100 will be described.

As shown in FIG. 4, 10° and −350° are respectively stored in the ROM of the controller 13 as the reference rotation angles of the steering shaft 2 corresponding to first pulse signal pulses c and b from the index sensor 25.

A normal state when the ignition switch is on will be described first. The controller 13 determines that the steering shaft 2 is in a neutral position, in other words, that a vehicle is in a straight state. Specifically, in a case where the vehicle speed is equal to or greater than a prescribed speed, for example, equal to or greater than 25 km/h, the controller 13 determines that the vehicle is in the straight state when the steering torque detected by the torque sensor 12, that is, the steering torque applied to the steering shaft 2 is equal to or smaller than a prescribed value and when the amount of change in the rotation angle of the electric motor 10 that is calculated on the basis of the output signal of the high-resolution sensors 23 is equal to or smaller than a prescribed value. Preferably, the controller 13 determines that the vehicle is in the straight state when these conditions are held for a prescribed time or longer, for example, for 5 seconds or longer. If the steering torque is equal to or smaller than a prescribed value, it is highly likely that the steering wheel 1 is not steered and the steering shaft 2 is in a neutral position. However, when the steering wheel 1 is returned after right turn or left turn, the steering torque is small since the steering wheel 1 is not operated. Thus, the condition in which the amount of change in the rotation angle of the electric motor 10 is equal to or smaller than a prescribed value is also required as the condition for determining the neutral position of the steering shaft 2.

In the case where the vehicle is determined to be in the straight state, the controller 13 identifies the rotation direction of the steering shaft 2 on the basis of the output signals from the high-resolution sensors 23, and determines, when the pulse signal that is output from the index sensor 25 for first time from the neutral position of the steering shaft 2 (the pulses c or b in FIG. 4) is received, the rotation angle of the steering shaft 2 at the present time by reading out the reference rotation angle from the ROM. Specifically, when the rotation direction of the steering shaft 2 is identified as the clockwise direction and when the output signal from the index sensor 25 (pulse c) is received, the rotation angle of the steering shaft 2 is determined to be 10°. When the rotation direction of the steering shaft 2 is identified as the anti-clockwise direction and when the output signal from the index sensor 25 (pulse b) is received, the rotation angle of the steering shaft 2 is determined to be −350°. As described above, a reference absolute rotation angle of the steering shaft 2 can be set on the basis of the output signal from the index sensor 25.

As shown in FIG. 4, because the pulse signal that is output from the index sensor 25 has a length corresponding to a prescribed rotation angle range, the controller 13 preferably reads out the reference rotation angle from the ROM at the center position of the pulse signal. This is because, when a magnetic sensor is used, there is a risk of the width of the pulse signal being changed due to temperature variation and aging over time, and if an end point of the pulse signal is used as the reference, it is not possible to precisely set the reference rotation angle. By setting the center position of the pulse signal as the reference, it is possible to precisely set the reference rotation angle even if the magnetic force or the sensitivity of the magnetic sensor is lowered.

The setting of the reference rotation, angle of the steering shaft 2 on the basis of the output signal from the index sensor 25 may be performed every time the controller 13 determines the straight state of the vehicle or may be performed only once after the ignition switch is turned on.

Furthermore, in the case where the pulse signal that is output from the index sensor 25 for first time from the neutral position of the steering shaft 2 is received, if a difference between the calculated rotation angle of the steering shaft 2 and the reference rotation angle stored in the ROM (10° or −350°) is equal to or greater than the preset allowable value, resetting of the reference rotation angle of the steering shaft 2 on the basis of the output signal from the index sensor 25 may be performed. By doing so, even if the rotation angle of the steering shaft 2 is detected with an error due to noise etc. during the steering-shaft-rotation-angle detection device 100 is operated, it is possible to reset the rotation angle of the steering shaft 2 on the basis of the output signal from the index sensor 25.

After the reference rotation angle of the steering shaft 2 has been set, as described above, the rotation angle of the steering shaft 2 is calculated by calculating the amount of change in the rotation angle of the steering shaft 2 on the basis of the speed reduction ratio of the speed reducer 11 and the amount of change in the rotation angle of the electric motor 10 that is calculated on the basis of the output signals from the high-resolution sensors 23, and by adding the amount of change in the rotation angle to the reference rotation angle.

Switching between the high-resolution sensors 23 and the low-resolution sensors 24 by turning the ignition switch on/off is as described above.

As described above, it is possible to calculate the rotation angle of the steering shaft 2. Here, if the steering angle of the steering wheel 1 is to be obtained on the basis of the calculated rotation angle of the steering shaft 2, the calculated rotation angle of the steering shaft 2 needs to be corrected by the torsion angle of the torsion bar 4. The reason for this is that, because the worm wheel 11*a* of the speed reducer 11 is connected to the output shaft 3 of the steering shaft 2, the amount of change in the rotation angle of the steering shaft 2 that is calculated from the amount of change in the rotation angle of the electric motor 10 and the speed reduction ratio of the speed reducer 11 is equivalent to the amount of change in the rotation angle of the output shaft 3, and it is not equivalent to the amount of change in the rotation angle of the input shaft 7, that is, the rotation angle of the steering wheel 1. Because the input shaft 7 and the output shaft 3 rotate relatively by the angle corresponding to the torsion angle of the torsion bar 4, this relative rotation needs to be corrected. To give an explanation on the correction method, for example, if the spring constant of the torsion bar 4 is assumed to be 2 Nm/deg and the steering torque, that is, the detected value by the torque sensor 12 is assumed to be 4 Nm, then the torsion angle between the input shaft 7 and the output shaft 3 is 2°. In other words, the correction value can be calculated to be 2°.

By adding the correction value to the amount of change in the rotation angle of the output shaft 3 that is calculated from the amount of change in the rotation angle of the electric motor 10, the amount of change in the rotation angle of the input shaft 7 is calculated, and by adding this amount of change in the rotation angle to the reference rotation angle of the steering shaft 2, it is possible to obtain the steering angle of the steering wheel 1.

As described above, if the steering angle of the steering wheel 1 is to be obtained, it is required to calculate the rotation angle the of the input shaft 7 of the steering shaft 2, and in such a case, the amount of change in the rotation angle of the steering shaft 2 (the output shaft 3), which is calculated from the amount of change in the rotation angle of the electric motor 10 and the speed reduction ratio of the speed reducer 11, needs to be corrected by the torsion angle of the torsion bar 4.

On the other hand, because the index sensor 25 is provided on the input shaft 7, there is no need to correct the reference rotation angle by the torsion angle of the torsion bar 4 when the reference rotation angle of the steering shaft 2 is set on the basis of the output signal from the index sensor 25.

Next, a case in which a battery of a vehicle is removed will be described. If a battery is removed, information of the rotation angle of the steering shaft 2 stored in the RAM of the controller 13 is lost. However, with the steering-shaft-rotation-angle detection device 100, when the ignition switch is turned on and if the vehicle is determined to be in the straight state as described above, the controller 13 can reset the reference rotation angles of the steering shaft 2 by reading out the reference rotation angles of the steering shaft 2 from the ROM on the basis of the output signal from the index sensor 25. Therefore, it is possible to re-calculate the rotation angle of the steering shaft 2. As described above, because the reference rotation angles of the steering shaft 2 are stored in ROM that is a nonvolatile memory, even after a battery has been exchanged on a vehicle, it is possible to automatically perform re-calculation of the rotation angle of the steering shaft 2.

According to the above described embodiment, the following advantages and effects can be afforded.

Because the rotation angle of the steering shaft 2 is calculated on the basis of the speed reduction ratio of the speed reducer 11 and the rotation angle of the electric motor 10 that is calculated on the basis of the output signal of the angle sensors 22, it is possible to detect the rotation angle of the steering shaft 2 at higher resolution as compared with the case in which the rotation angle of the steering shaft 2 is detected by a sensor provided on the steering shaft 2. In addition, because the angle sensors 22 are for outputting signals in accordance with the rotation of the ring magnet 21 fixed to the rotation shaft of the electric motor 10, the structure thereof is simple.

In addition, even after a battery of a vehicle is exchanged, by reading out the reference rotation angle of the steering shaft 2 from a nonvolatile memory on the basis of the pulse signal that is output from the index sensor 25 for first time from the neutral position of the steering shaft 2, re-calculation of the rotation angle of the steering shaft 2 is performed automatically.

(Second Embodiment)

Next, a steering-shaft-rotation-angle detection device 200 according to a second embodiment of the present invention will be described below. In the following, differences with the first embodiment mentioned above will be mainly described, and the components that are the same as those in the first embodiment are assigned the same reference numerals and a description thereof shall be omitted.

The steering-shaft-rotation-angle detection device 200 differs from the steering-shaft-rotation-angle detection device 100 according to the above-mentioned first embodiment in that a torque output from the electric motor 10 is applied to the rack shaft 5 as an assist torque via a gear mechanism 30 and a bail screw mechanism 40. Both devices are similar in that the torque output from the electric motor 10 is calculated on the basis of the steering torque detected by the torque sensor 12.

The gear mechanism 30 includes a drive pulley 31 that is connected to the output shaft of the electric motor 10 and a driven pulley 33 that is connected to the drive pulley 31 through a belt 32. The rotation from the electric motor 10 is transmitted to the driven pulley 33 through, the drive pulley 31 and the belt 32. The diameter of the driven pulley 33 is larger than that of the drive pulley 31, and the rotation torque of the electric motor 10 transmitted to the driven pulley 33 is amplified.

The ball screw mechanism 40 includes a helical groove 41 formed on the outer circumference of the rack shaft 5 and a ball nut 42 that is formed to have a cylindrical shape that covers the outer circumference of the rack, shaft 5 and that has a helical groove on the inner circumference that engages with the helical groove 41. The ball nut 42 is provided so as to be connected with the driven pulley 33, and the rotation of the driven pulley 33 is converted to the movement In the axial direction of the rack, shaft 5 by the ball screw mechanism 40.

A rack 5a is formed on the rack shaft 5, and the rack 5a engages with the pinion 3a that is provided at the lower end of the output shaft 3. As described above, the rack shaft 5 is connected with the steering shaft 2 through a rack-and-pinion mechanism 45 that is configured with the rack 5a and the pinion 3a.

As described above, the rotation of the electric motor 10 is transmitted to the steering shaft 2, with its speed reduced, through the gear mechanism 30, the ball screw mechanism 40, and the rack-and-pinion mechanism 45. The gear mechanism 30, the ball, screw mechanism 40, and the rack-and-pinion mechanism 45 correspond to a speed reduction mechanism according to the present invention.

The speed reduction ratio of this speed reduction mechanism will be described. The speed reduction ratio of the drive pulley 31 to the driven pulley 33 is 1:3. Because the rack shaft 5 moves 7 mm for every rotation of the ball nut 42 and the rack shaft 5 moves 70 mm for every rotation of the steering shaft 2, the speed reduction ratio of the ball nut 42 to the steering shaft 2 is 1:10. Therefore, the speed reduction ratio of the speed reduction mechanism is 1:30. In other words, the electric motor 10 rotates 30 times for every rotation of the steering shaft 2.

As described above, with the steering-shaft-rotation-angle detection device 200, the resolution of the high-resolution sensors 23 for the rotation angle of the steering shaft 2 is calculated to be 0.011° as in the following expression.

Resolution of high-resolution sensor for the rotation angle of the steering shaft 2=360/360/3/30=0.011°

In addition, the resolution of the low-resolution sensors 24 for the rotation angle of the steering shaft 2 is calculated to be 1° as in the following expression.

Resolution of low-resolution sensor for the rotation angle of the steering shaft 2=360/4/3/30≤1°

The steering-shaft-rotation-angle detection device 200 differs from the steering-shaft-rotation-angle detection device 100 according to the above-mentioned first embodiment only in the speed reduction ratio, and the detection methods of the rotation angle of the steering shaft 2 are the same. Therefore, effects and advantages similar to those afforded in the above-mentioned first embodiment will also be afforded in this second embodiment.

It is apparent- that the present invention is not limited to the above-mentioned embodiment and various modifications are possible so long as they are within its technical idea.

For example, values for the resolution of the high-resolution sensors 23 and the low-resolution sensors 24 for the rotation angle of the steering shaft 2 illustrated in the above-mentioned embodiments are examples, and they may be adjusted freely.

In addition, in the above-mentioned embodiments, the rotation angle of the electric motor 10 is calculated on the basis of the signal from the angle sensors 22 that is output in accordance with the rotation of the ring magnet 21. However, instead of this configuration, similar advantages and effects as those in the above-mentioned embodiments may be afforded by using a rotating body that has radially formed slits and that is attached to the rotation shaft, of the electric motor 10 and an optical sensor consisting of a light emitting unit, and a light receiving unit fixed so as to sandwich the rotating body, and by calculating the rotation angle of the electric motor 10 on the basis of the signal from the optical sensor.

In addition, in the above-mentioned embodiments, the index sensor 25 is provided on the input shaft 7. However, instead of this, the index sensor 25 may be provided on the output shaft 3. In this case, in order to obtain the steering angle of the steering wheel 1 on the basis of the calculated rotation angle, of the steering shaft 2, the reference rotation angle needs to be corrected by the torsion angle of the torsion bar 4 when the reference rotation angle of the steering shaft 2 is set on the basis of the output signal from the index sensor 25. A method for calculating the correction value is as described, above.

In addition, in the above-mentioned embodiments, the steering angle of the steering wheel 1 is obtained on the basis of the calculated rotation angle of the steering shaft 2. However, in addition to this, a turning angle of the wheels 6 may also he calculated on the basis of the calculated rotation angle of the steering shaft 2. The turning angle of the wheels 6 is a steered angle from the neutral state in which the wheels 6 are directed in the straight direction. By rotating the steering shaft 2, the rack shaft 5 moves in the axial direction to steer the wheels 6, and therefore, it is possible to calculate the turning angle of the wheels 6 on the basis of the rotation angle of the steering shaft 2.

If the turning angle of the wheels 6 is to be obtained on the basis of the calculated rotation angle of the steering shaft 2, the amount of change in the rotation angle of the steering shaft 2 that is calculated from the amount of change in the rotation angle of the electric motor 10 need not be corrected by the torsion angle of the torsion bar 4. The reason for this is that, if the turning angle of the wheels 6 is to be obtained, the rotation angle of the output shaft 3 of the steering shaft 2 needs to be calculated, and the worm wheel 11a of the speed reducer 11 is connected to the output shaft 3 of the steering shaft 2. On the other hand, because the index sensor 25 is provided on the input shaft 7, when the reference rotation angle of the steering shaft 2 is set on the basis of the output signal from the Index sensor 25, the reference rotation angle needs to be corrected by the torsion angle of the torsion bar 4. However, by providing the index sensor 25 on the output shaft 3, when the reference rotation angle of the steering shaft 2 is set on the basis of the output signal, from the index sensor 25, the reference rotation angle needs not be corrected by the torsion angle of the torsion bar 4.

This application claims priority based on Japanese Patent Application No. 2011-078166 filed with the Japan Patent Office on Mar. 31, 2011, the entire contents of which are incorporated into this specification.

INDUSTRIAL APPLICABILITY

The steering-shaft-rotation-angle detection device according to the present invention can be utilized in a vehicle in which various controls are performed on the basis of a rotation angle of a steering shaft.

The invention claimed is:

1. A steering-shaft-rotation-angle detection device for detecting a rotation angle of a steering shaft that is rotated by operation of a steering wheel, the steering-shaft-rotation-angle detection device comprising:
> an electric motor that assists steering of the steering wheel by a driver;
> a speed reduction mechanism that reduces speed of rotation of the electric motor and transmits the rotation to the steering shaft;
> a rotating body that is attached to a rotation shaft of the electric motor;
> a signal output unit that outputs a signal in accordance with rotation of the rotating body;
> a reference-rotational-position detector that detects a reference rotational position of the steering shaft; and
> a controller that
> > sets a reference rotation angle of the steering shaft on the basis of an output signal from the reference-rotational-position detector,
> > calculates an amount of change in the rotation angle of the steering shaft on the basis of a rotation angle of the rotating body, the rotation angle of the rotating body calculated on the basis of the output signal from the signal output unit and a speed reduction ratio of the speed reduction mechanism, and
> > calculates the rotation angle of the steering shaft by adding the calculated amount of change in the rotation angle to the reference rotation angle,
>
> wherein
> the reference-rotational-position detector outputs a pulse of signal for every rotation of the steering shaft, and
> the controller sets, on the basis of the received pulse of signal that is output from the reference-rotational-position detector for a first time from a neutral position of the steering shaft, a preset reference rotation angle corresponding to this pulse of signal as the reference rotation angle of the steering shaft.

2. A steering-shaft-rotation-angle detection device according to claim 1, wherein
> when
> > the pulse of signal output from the reference-rotational-position detector for the first time from the neutral position of the steering shaft is received, and
> > a difference between the calculated rotation angle of the steering shaft and the preset reference rotation angle is equal to or greater than a preset allowable value,
>
> the controller resets the reference rotation angle of the steering shaft on the basis of the output signal from the reference-rotational-position detector.

3. A steering-shaft-rotation-angle detection device according to claim 1, wherein
> when information related to the rotation angle of the steering shaft is lost, the controller
> > reads out, on the basis of the received pulse of signal that is output from the reference-rotational-position detector for the first time from the neutral position of the steering shaft, the preset reference rotation angle corresponding to this pulse of signal from a nonvolatile storage unit, and
> > sets the preset reference rotation angle as the reference rotation angle of the steering shaft.

4. A steering-shaft-rotation-angle detection device for detecting a rotation angle of a steering shaft that is rotated by operation of a steering wheel, the steering-shaft-rotation-angle detection device comprising:
> an electric motor that assists steering of the steering wheel by a driver;
> a speed reduction mechanism that reduces speed of rotation of the electric motor and transmits the rotation to the steering shaft;
> a rotating body that is attached to a rotation shaft of the electric motor;
> a signal output unit that outputs a signal in accordance with rotation of the rotating body; and
> a controller that
> > calculates a rotation angle of the rotating body on the basis of the output signal from the signal output unit and
> > calculates, on the basis of the rotation angle of the rotating body and a speed reduction ratio of the speed reduction mechanism, a rotation angle of the steering shaft,
>
> wherein
> the signal output unit includes a high-resolution output unit having relatively high resolution and a low-resolution output unit having relatively low resolution,
> switching is performed such that the high-resolution output unit is operated when an ignition switch of a vehicle is on and the low-resolution output unit is operated when the ignition switch of the vehicle is off,
> the rotating body is a ring magnet that is magnetized in a rotation direction,
> the high-resolution output unit consists of two output units that output sinusoidal signals having a plurality of cycles whose phases are shifted in accordance with rotation of the rotating body,
> the controller
> > calculates an amount of change in an electrical angle according to a table in which relations between the output signals from the high-resolution output unit and electrical angles of the electric motor are stated, and
> > calculates the rotation angle of the rotating body from the amount of change,
>
> the low-resolution output unit consists of two output units that output pulse signals such that there is a change in output for every prescribed electrical angle in accordance with rotation of the rotating body, and
> the controller determines in which section among a plurality of sections, which are sectioned at the every prescribed electrical angle, an electrical angle of the electric motor is positioned on the basis of a change in the pulse signals output from the low-resolution output unit.

5. A steering-shaft-rotation-angle detection device for detecting a rotation angle of a steering shaft that is rotated by operation of a steering wheel, the steering-shaft-rotation-angle detection device comprising:
> an electric motor that assists steering of the steering wheel by a driver;
> a speed reduction mechanism that reduces speed of rotation of the electric motor and transmits the rotation to the steering shaft;
> a rotating body that is attached to a rotation shaft of the electric motor;
> a signal output unit that outputs a signal in accordance with rotation of the rotating body; and
> a controller that
> > calculates a rotation angle of the rotating body on the basis of the output signal from the signal output unit, and
> > calculates, on the basis of the rotation angle of the rotating body and a speed reduction ratio of the speed reduction mechanism, a rotation angle of the steering shaft, wherein the signal output unit includes a high-resolution output unit having relatively high resolution and a low-resolution output unit having relatively low resolution, the low-resolution output unit consists of two output units that output pulse signals such that there is a change in output for every prescribed electrical angle in accordance with rotation of the rotating body, when an ignition switch of the vehicle is off, the controller becomes a standby state in which the controller only counts and stores the number of changes in the pulse signals output from the low-resolution output unit, when the ignition switch of the vehicle is turned on, the controller determines in which section among a plurality of sections, which are sectioned at the every prescribed electrical angle, an electrical angle of the electric motor is positioned from the stored number of changes in the pulse signals, when the ignition switch of the vehicle is off, the low-resolution output unit performs detection of rotation of the electric motor, and at the same time, the controller becomes a halted state, and the controller becomes the standby state when the rotation of the electric motor is detected by the low-resolution output unit.

6. A steering-shaft-rotation-angle detection device for detecting a rotation angle of a steering shaft that is rotated by operation of a steering wheel, the steering-shaft-rotation-angle detection device comprising:

an electric motor that assists steering of the steering wheel by a driver;

a speed reduction mechanism that reduces speed of rotation of the electric motor and transmits the rotation to the steering shaft;

a rotating body that is attached to a rotation shaft of the electric motor;

a signal output unit that outputs a signal in accordance with rotation of the rotating body; and a controller that calculates a rotation angle of the rotating body on the basis of the output signal from the signal output unit, and calculates, on the basis of the rotation angle of the rotating body and a speed reduction ratio of the speed reduction mechanism, a rotation angle of the steering shaft, wherein the signal output unit includes a high-resolution output unit having relatively high resolution and a low-resolution output unit having relatively low resolution, when an ignition switch of a vehicle is off, the low-resolution output unit performs detection of rotation of the electric motor, and at the same time, the controller becomes a halted state, and the low-resolution output unit is switched to the high-resolution output unit when the rotation of the electric motor is detected by the low-resolution output unit.

7. A steering-shaft-rotation-angle detection device according to claim 1, wherein when a vehicle speed is equal to or greater than a prescribed speed, a steering torque applied to the steering shaft is equal to or less than a prescribed value, and an amount of change in the rotation angle of the rotating body that is calculated on the basis of the output signal of the signal output unit is equal to or less than a prescribed value, the controller determines that the steering shaft is in the neutral position.

8. A steering-shaft-rotation-angle detection device according to claim 1, wherein the controller sets the preset reference rotation angle as the reference rotation angle of the steering shaft at the center position of the pulse of signal that is output from the reference-rotational-position detector.

9. A steering-shaft-rotation-angle detection device according to claim 1, wherein the steering shaft includes an input shaft that rotates in accordance with operation of the steering wheel, and an output shaft that is connected to the input shaft through a torsion bar and linked to a rack shaft, the rotation of the electric motor is transmitted to the output shaft through the speed reduction mechanism, the reference-rotational-position detector is attached to the input shaft, and when a rotation angle of the input shaft of the steering shaft is to be calculated, the controller corrects the amount of change in the rotation angle by a torsion angle of the torsion bar when the amount of change in the rotation angle of the steering shaft is calculated on the basis of the rotation angle of the rotating body and the speed reduction ratio of the speed reduction mechanism.

10. A steering-shaft-rotation-angle detection device according to claim 1, wherein the steering shaft includes an input shaft that rotates in accordance with operation of the steering wheel, and an output shaft that is connected to the input shaft through a torsion bar and linked to a rack shaft, the rotation of the electric motor is transmitted to the output shaft through the speed reduction mechanism, the reference-rotational-position detector is attached to the output shaft, and when a rotation angle of the input shaft of the steering shaft is to be calculated, the controller corrects the amount of change in the rotation angle by a torsion angle of the torsion bar when the amount of change in the rotation angle of the steering shaft is calculated on the basis of the rotation angle of the rotating body and the speed reduction ratio of the speed reduction mechanism, and corrects the reference rotation angle by the torsion angle of the torsion bar when the reference rotation angle of the steering shaft is set on the basis of the output signal of the reference-rotational-position detector.

11. A steering-shaft-rotation-angle detection device according to claim 1, wherein the steering shaft includes an input shaft that rotates in accordance with operation of the steering wheel, and an output shaft that is connected to the input shaft through a torsion bar and linked to a rack shaft, the rotation of the electric motor is transmitted to the output shaft through the speed reduction mechanism, the reference-rotational-position detector is attached to the input shaft, and when a rotation angle of the output shaft of the steering shaft is to be calculated, the controller corrects the reference rotation angle by a torsion angle of the torsion bar when the reference rotation angle of the steering shaft is set on the basis of the output signal of the reference-rotational-position detector.

\* \* \* \* \*